United States Patent [19]

Kosednar et al.

[11] Patent Number: 4,669,049
[45] Date of Patent: May 26, 1987

[54] TEMPERATURE MEASURING INSTRUMENT AND ADAPTER FOR SAME

[75] Inventors: Joseph F. Kosednar; Raymond F. Mohrman, both of St. Louis, Mo.; Philip M. Gundlach, Jr., Highland, Ill.

[73] Assignee: Mon-A-Therm, Inc., St. Louis, Mo.

[21] Appl. No.: 785,494

[22] Filed: Oct. 8, 1985
(Under 37 CFR 1.47)

[51] Int. Cl.[4] .................. G06F 15/42; G01K 7/14; G01K 7/20
[52] U.S. Cl. .................. 364/557; 364/571; 374/100; 374/170; 374/182
[58] Field of Search .................. 364/557, 571, 573; 374/100, 134, 168, 169, 170, 171, 179, 180, 181, 182

[56] References Cited

U.S. PATENT DOCUMENTS

| | | | |
|---|---|---|---|
| 3,447,376 | 6/1969 | Turtora et al. | 374/168 |
| 3,534,809 | 10/1970 | Charitat, Jr. | 374/168 |
| 3,978,325 | 8/1976 | Goldstein et al. | 374/169 |
| 4,122,719 | 10/1978 | Carlson et al. | 374/167 |
| 4,157,663 | 6/1979 | Ihlenfeldt et al. | 374/181 |
| 4,293,916 | 10/1981 | Del Re et al. | 364/571 |
| 4,341,117 | 7/1982 | Goldstein et al. | 374/170 |
| 4,403,296 | 9/1983 | Prosky | 364/573 |
| 4,466,749 | 8/1984 | Cunningham et al. | 364/557 X |
| 4,493,564 | 1/1985 | Epstein | 374/179 |
| 4,537,516 | 8/1985 | Epstein | 374/1 |
| 4,562,554 | 12/1985 | Stixrud et al. | 364/557 X |
| 4,588,308 | 5/1986 | Saito | 374/181 |
| 4,607,962 | 8/1986 | Nagao et al. | 374/170 |

Primary Examiner—Felix D. Gruber
Attorney, Agent, or Firm—Gregory E. Upchurch

[57] ABSTRACT

An adapter to permit a temperature measuring instrument ordinarily used with a thermistor temperature sensor to be used with a temperature probe of the thermocouple type. The adapter has an output for connection to the temperature measuring instrument and has circuitry for processing the signal from the thermocouple probe to produce at the adapter output a resistance which a thermistor sensor would generate at the same temperature. A temperature measuring instrument for efficient use of an electrical source has circuitry for processing a temperature related signal according to a sequence of operations to provide an electrical variable having a value which is a function of the temperature being measured. The sequence commences with connection of the electrical source to the processing circuitry. At the completion of the sequence a signal indicative of completion is produced. In responsive to the completion signal the electrical source is disconnected from the processing circuitry. The electrical source is reconnected to the processing circuitry a predetermined time after the disconnection.

24 Claims, 7 Drawing Figures

TEMPERATURE MEASURING INSTRUMENT AND ADAPTER FOR SAME

BACKGROUND OF THE INVENTION

This invention relates to an adapter which permits a temperature measuring instrument designed only for use with a particular type of temperature sensor to be used with temperature sensing probes of a type having a temperature sensing element different from that of the temperature sensor. More particularly for example, the present invention relates to an improved adapter for producing a resistance which simulates a thermistor in response to the output voltage of a thermocouple. The invention allows the use of thermocouple sensing probes with a temperature measuring instrument designed to utilize a thermistor temperature sensor. This invention also relates to an energy efficient temperature measuring instrument powered by a battery.

For temperature measurement of a patient during surgery and for other thermometric applications, thermocouples are widely used. These are formed from a tiny sensing junction between the ends of two thermally conductive fine metallic wires such as copper and constantan and a reference thermojunction of like metals. The thermocouple produces a voltage which is a function of the difference between the temperatures of the sensing and reference junction. Because of its small size the sensing thermojunction responds rapidly to changes in the temperature of the patient, can be conveniently applied to any selected point on or in the patient's body and compared to thermistors, thermojunctions are less expensive, disposable and have less thermal "mass" for faster temperature response.

Many presently available temperature monitoring and display instruments are designed for use only with thermistors. The owners of this equipment would prefer to be able to use disposable thermojunction sensors, but are deterred by the cost of replacing such instruments with those designed for use with thermocouples. It would be desirable therefore to be able to utilize disposable thermojunction sensors with these existing instruments intended for use with only thermistor sensing elements.

The patient whose temperature is to be measured must be safe from electrical shock. To provide electrical isolation to protect the patient from electrical shock, battery energized temperature measuring instruments are often used. But unless energy consumption is minimized, the batteries will have to be replaced frequently.

One approach to an adapter intended to interface thermojunctions with temperature monitoring and display instruments using thermistor sensors is shown in Lindberg, U.S. Ser. No. 312,010 filed Oct. 16, 1981 now abandoned of which the present assignee is also the assignee. Briefly, Lindberg placed a thermistor, having its terminals connected to the output terminals of the adapter, in conductive heat transfer relationship with an electrical resistance heater. At input terminals of the adapter was connected a thermocouple which produced a voltage functionally related to the temperature and used by a control circuit. The control circuit caused the electrical resistance heater to be heated so that the temperature of the thermistor would be at the temperature corresponding to the thermocouple voltage thereby having the thermistor produce the corresponding resistance. This adapter had some inherent disadvantages. Precision heating with the electrical resistance heater and rapid dissipation of heat with a falling temperature is difficult to obtain. Because the thermistor was incorporated in heat transfer relationship with the electrical resistance heater, the adapter could not be conveniently used with different types of temperature measuring instruments having inputs requiring different thermistor characteristics. The adapter also required substantial amounts of energy from a battery which necessitated its frequent replacement.

SUMMARY OF THE INVENTION

Among the several objects of the present invention may be noted the provision of an adapter, for use with a temperature measuring instrument having an input for only a particular type of temperature sensor, which converts the output of a temperature sensing probe of a type having a temperature sensing element different from that of the temperature sensor to an input suitable for the measuring instrument; the provision of such an adapter for an instrument designed for use with a thermistor temperature sensor and which converts the output of a probe having a thermojunction sensing element to an input suitable for that instrument; the provision of such an adapter which includes isolation for reducing the chance of electrical shock; the provision of such an adapter which is portable, compact, efficient, and inexpensive; the provision of such an adapter which may be used with temperature measuring instruments requiring different types of thermistors; the provision of such an adapter which is battery powered; and the provision of such an adapter which gives a warning when the voltage level of the battery is too low for reliable operation.

Further among the objects of the invention may be noted the provision of a temperature measuring instrument for efficient use of energy from an electrical energy source; provision of such a temperature measuring instrument for prolonging the life of a battery to reduce the replacement of the battery; provision of such an instrument which is portable, compact and efficient; and provision of such an adapter, as described above, which conserves electrical energy by periodically disconnecting the source from a processing means used in the conversion of the thermocouple voltage and then reconnecting the source a predetermined time later.

Briefly described, an adapter of the invention permits a temperature measuring instrument having an input terminal for connection ordinarily to a temperature sensor having a resistance which varies as a function of temperature to be utilized with a temperature sensing probe of a type having a temperature sensing element which is different from that of the temperature sensor and which produces an electrical signal having a parameter which varies as a function of temperature. The adapter has an output for connection to the input terminal of the temperature measuring instrument. The adapter comprises a means for processing the electrical signal to generate a corresponding digital control signal representative of different values functionally related to the parameter of the electrical signal. The adapter further comprises means responsive to the different values respectively of the digital control signal for producing at the adapter output a resistance which varies as a predetermined function of the parameter of the electrical signal.

Briefly described a temperature measuring instrument of the invention is for efficient use of energy from an electrical energy source and for use with a sensor for supplying a first signal having a parameter functionally related to temperature. The instrument comprises means for processing the first signal according to a predetermined sequence of operations to provide at the output terminals of the temperature measuring instrument an electrical variable having a value which is a function of the temperature being measured, the predetermined sequence commencing with connection of the electrical energy source to the processing means so that when the sequence of operations is completed a second signal indicative of completion is produced. The instrument further comprises means responsive to the second signal for disconnecting the electrical energy source from the processing means and then reconnecting the electrical energy source to the processing means a predetermined time period after the disconnection.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF A PREFERRED EMBODIMENT

Figure 1:
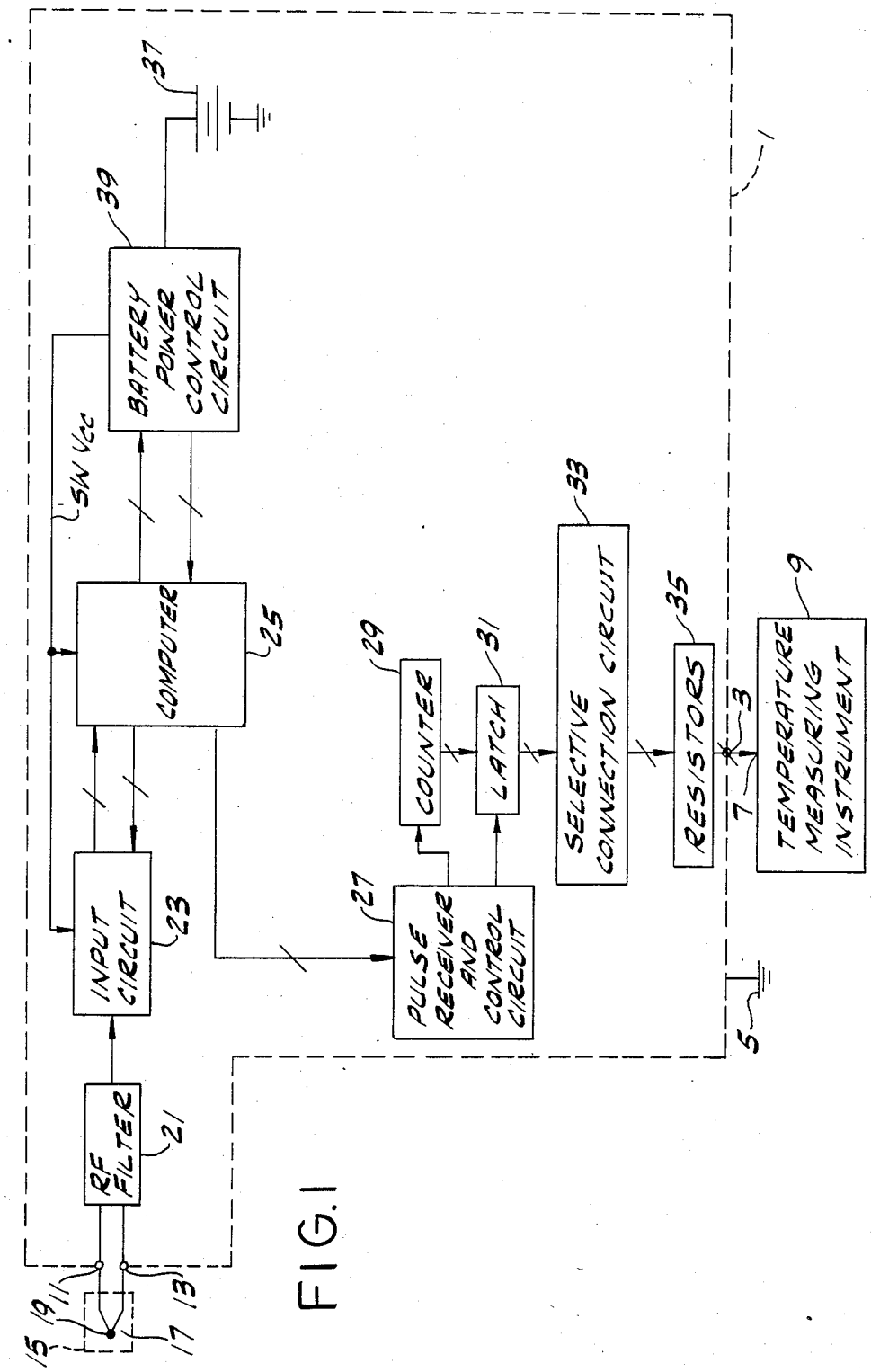
FIG. 1 is a block diagram of the circuitry for an adapter of the present invention.

In FIG. 1, an adapter 1 has output terminals 3 and a common 5. Output terminals 3 are for connection to an input 7 of a temperature measuring instrument 9. "Terminal" as used herein refers to a circuit point and a terminal need not necessarily be a physical terminal component. Instrument 9 is of a commercially available type used in medicine for tympanic, esophageal, rectal, or skin temperature monitoring. The instrument 9 in its ordinary intended use has its input 7 connected to a thermistor-type temperature sensor as described in U.S. Pat. No. 161,880 issued July 24, 1979, to H.S. Prosky and hereby incorporated by reference. The thermistor has a resistance which varies in a predetermined relation to its temperature.

The adapter 1 has input terminals 11 and 13 which connect to a temperature sensing probe 15 placed in the region having the temperature to be measured and including a disposable thermocouple 17 made of a pair of conductors made of dissimilar metals, such as copper and constantan, connected at a junction 19. Junction 19 is thus the thermojunction which is exposed to the temperature to be measured. The thermocouple 17 produces an electrical signal having a parameter, e.g. voltage, which varies as a function of temperature. The copper and constantan conductors are electrically insulated from each other and extend between the junction 19 and the input terminals 11 and 13. A radio frequency RF filter 21 (FIG. 1) has its input connected to input terminals 11 and 13 and filters any noise which may be induced into the thermocouple conductors, which can be relatively long and need not be shielded.

The output of filter 21 is supplied to an input circuit 23, as shown in FIG. 1. Input circuit 23 is controlled by a computer 25. The input circuit 23, under the control and with the processing of computer 25, converts an analog thermocouple voltage signal from filter 21 to a corresponding digital value. The computer 25 includes, for example, a microprocessor operating according to a prestored program with associated circuitry which is described in detail hereinafter. The analog to digital conversion is accomplished by a process known as dual-slope integration. It is to be understood that the computer operating according to prestored software is but one means of processing the analog voltage and other means using firmware or hardware are also contemplated.

The computer 25 processes information from the input circuit 23 to determine a corresponding digital time value resulting from the dual-slope integration. A table is stored in the computer 25 which is used for converting the digital time value corresponding to the voltage across junction 19 at the temperature to which the thermocouple 17 is exposed, to a corresponding value indicative of the conductance (reciprocal of resistance) of an equivalent thermistor ordinarily used with instrument 9 when the thermistor is exposed to that temperature. The computer 25 then generates a series of pulses corresponding in number to the value indicative of conductance. The pulses are received by a pulse receiver and control circuit 27.

The pulse receiver and control circuit 27 conveys these pulses to a counter 29 controlled by circuit 27. The pulses are counted by the counter 29. As a result the counter 29 then holds a count which in parallel form represents the number of pulses in the latest series of pulses, which number corresponds to the value indicative of conductance. The count is received, also under the control of the pulse receiver and control circuit 27, by a latch 31.

The latch 31 stores the count of the counter 29 and thereby provides a form of digital control signal to a selective connection circuit 33. In response to the digital control signal, e.g. the count, from latch 31, the selective connection circuit 33 connects subsets of a set of resistors 35 between the output terminals 3. These subsets so selected have the conductance which the thermistor ordinarily used with instrument 9 would have at the temperature to which thermocouple 17 is exposed. Because the subsets are selected in response to a digital control signal, the conductance between output terminals 3 varies as the temperature of thermocouple 17 varies.

The latch 31 constitutes means responsive to the processing means for storing the digital control signal. The input circuit 23, computer 25, pulse receiver and control circuit 27, counter 29, and latch 31 constitute means for processing an electrical signal having a parameter which varies as a function of temperature to generate a corresponding digital control signal representative of different values functionally related to the parameter of the electrical signal. The input circuit 23, computer 25, pulse receiver and control circuit 27, counter 29, and latch 31 also constitute means for processing the thermocouple voltage to generate a corresponding digital control signal representative of different values functionally related to the thermocouple voltage. The selective connection circuit 33 and resistors 35 constitute means responsive to the different values respectively of the digital control signal for producing at the adapter output a resistance which varies as a predetermined function of the parameter of the electrical signal (e.g. from sensor 15). The selective connection circuit 33 and resistors 35 also constitute means responsive to the different values respectively of the digital control signal for selectively connecting across the output terminal subsets of a set of resistances corresponding to respective values of the digital control signal.

A battery 37 is used as an electrical energy source to a battery power control circuit 39. Battery power control circuit 39 connects and disconnects battery 37 from the computer 25 and input circuit 23. When the battery 37 is connected, the input circuit 23 and computer 25 proceed through a predetermined sequence of operations to process a first electrical signal e.g. the filtered thermocouple voltage. The battery power control circuit 39 receives a second electrical signal from the computer 25 indicative of completion of these operations. In response to this second electrical signal the battery power control circuit 39 disconnects the battery 37 in order to reduce the energy drain on the battery and thus provide for the efficient use of the battery 37. A predetermined time period after the disconnection, the battery power control circuit 39 reconnects the battery 37 to the input circuit 23 and computer 25 and the predetermined sequence of operations is begun again.

The input circuit 23 and the computer 25 constitute means for processing the first signal according to a predetermined sequence of operations to provide at the output terminals of the temperature measuring instrument (e.g. adapter 1) an electrical variable having a value which is a function of the temperature being measured, the predetermined sequence commencing with the connection of the electrical energy source to the processing means so that when the sequence of operations is completed a second signal indicative of completion is produced. The battery control circuit 39 constitutes means responsive to a signal for disconnecting an electrical energy source from the processing means and then reconnecting the electrical energy source to the processing means a predetermined time period after the disconnection.

Figure 2:
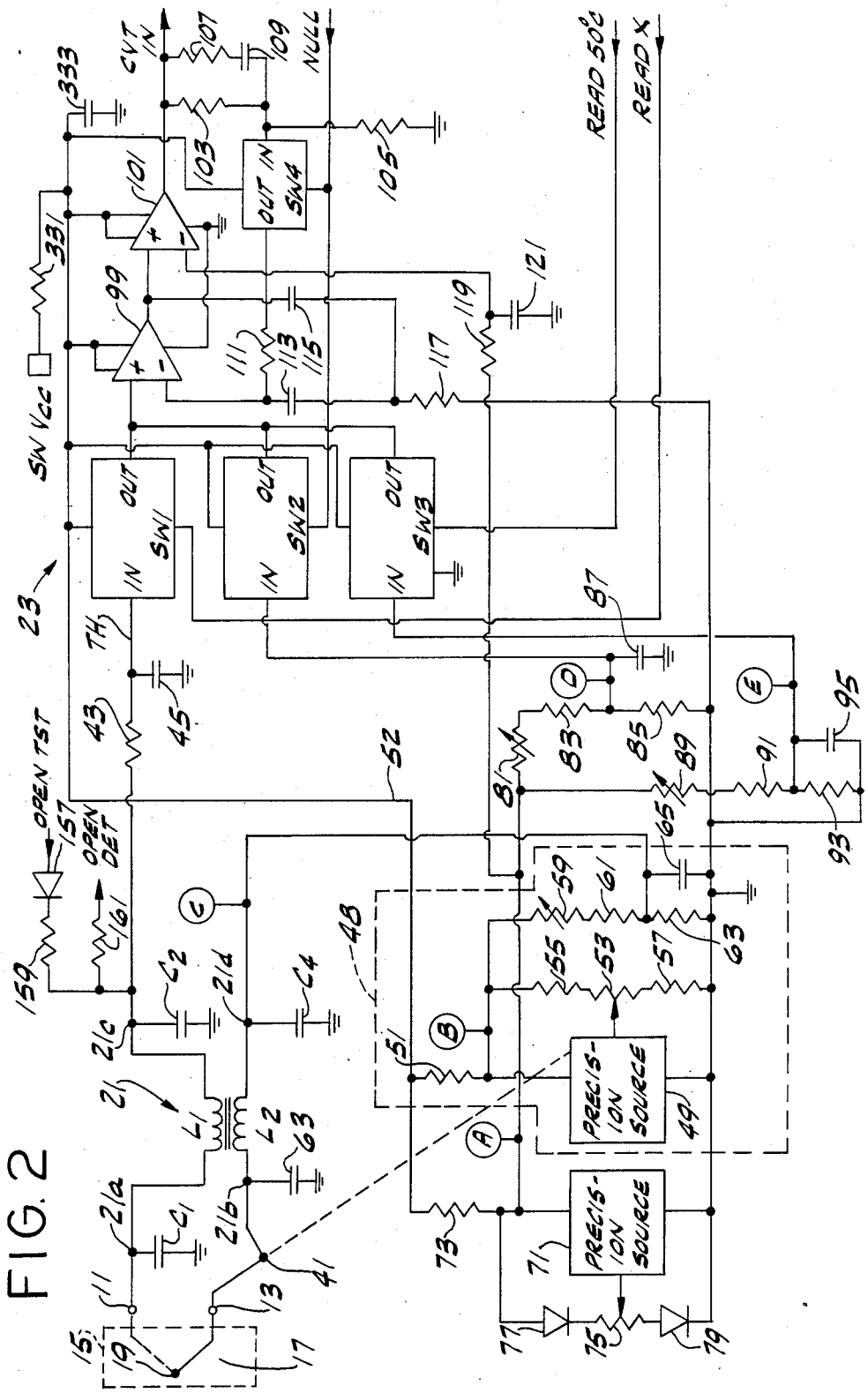
FIG. 2 is a circuit diagram of an RF filter and an input circuit included in FIG. 1.

The RF filter 21 and input circuit 23 are shown in detail in FIG. 2. RF filter 21 is a four (two input, two output) terminal network consisting of two magnetically coupled inductances L1 and L2, each connecting one input terminal 21a or 21b of the filter to one output terminal 21c or 21d respectively of the filter. Four equal capacitances C1, C2, C3 and C4 are each connected between a respective terminal of RF filter 21 and the circuit common. The input terminals 21a and 21b are respectively connected to the input terminals 11 and 13 of the adapter 1.

As shown in FIG. 2 a cold junction 41 is formed where constantan connects to copper between terminal 21b and input terminal 13. The constantan conductor forms the temperature-sensitive junction 41 by virtue of its connection thereat, and this junction is called the "cold junction" herein, although it is not necessarily colder than junction 19. The output terminal 21c of the filter 21 is connected to a low pass filter composed of resistor 43 and capacitor 45. It is noted that variations in temperature at cold junction 41 unrelated to the temperature at sensor 15 can disadvantageously affect the accuracy of temperature measurement, unless the voltage across cold junction 41 is compensated, because the voltage across cold junction 41 subtracts from the voltage across junction 19. In FIG. 2 a circuit 48 is used to cancel out the voltage across cold junction 41 by adding thereto a cold junction offset potential, or compensating voltage C relative to common that is opposite in polarity and equal in magnitude to the voltage across the cold junction 41. As a result a compensated thermocouple voltage TH appears across the capacitor 45 for input to an electronically controlled switch SW1.

Circuit 48 includes a precision voltage source 49 such as a commercially available product with type number LM335 that produces a reference voltage B which is temperature dependent. A resistor 51 is connected between source 49 and a supply voltage line 52 so that current flows through precision source 49 to common. Also the precision source 49 is in thermal contact with the cold junction 41 as indicated by a dashed line between source 49 and cold junction 41. In this way any variations in temperature to which cold junction 41 is subjected are the same as the variations in temperature of the precision source 49. The potential at the wiper of a potentiometer 53, which is in series with a pair of resistors 55 and 57 between resistor 51 and common, is supplied to the precision source 49 at a third terminal thereof. This potentiometer 53 wiper potential is adjusted to a value which places the precision source 49 in the same dv/dT (change in voltage over change in temperature) relationship as the junction 41 when the voltage B of source 49 is divided down. Source 49 has approximately a ten millivolt per degree Centigrade dv/dT which remains very linear over a zero degree Centigrade to fifty degree Centigrade range. Variable resistor 59 and resistors 61 and 63 are connected in series between resistor 51 and common and are used to voltage divide by a factor of about 250 the voltage B from the precision source 49. Voltage C is the resulting voltage across resistor 63 and a bypass capacitor 65. Potentiometer 53 and variable resistor 59 are appropriately adjusted so that voltage C varies with temperature to cancel the voltage behavior of the cold junction 41 over a wide range of temperature.

Input circuit 23 performs dual-slope integration under the control of signals called NULL, READX and READ 50° C. Computer 25 supplies the control signals to control terminals of a set of electronically controlled analog switches SW1, SW2 SW3 and SW4 of input circuit 23 to close and open conductive paths in each of the switches between input and output terminals thereof marked IN and OUT respectively. The input of switch SW1 is connected to compensated thermocouple voltage TH. The inputs of switches SW2 and SW3 are connected to a pair of reference voltages D and E respectively.

Reference voltages D and E are developed using a precision source 71. Precision source 71 is a commercially available product with type number LM336 and produces a voltage reference A using a current from supply line 52 through a resistor 73. The potential at the wiper of a potentiometer 75, which is in series with diodes 77 and 79 between resistor 73 and common, is adjusted so that variations in temperature are compensated by diodes 77 and 79 and do not vary voltage A. Diodes 77 and 79 are connected on either side of potentiometer 75. The voltage A is applied to a voltage divider having a variable resistor 81, and resistors 83 and 85. The voltage D is developed across resistor 85 across which a capacitor 87 is connected. Similarly the voltage reference A is applied to another voltage divider network having a variable resistor 89 and resistors 91 and 93. The voltage E is developed across resistor 93, across which a capacitor 95 is connected.

Analog to digital conversion of the thermocouple voltage TH using dual-slope integration by input circuit 23 is now described. Initially a NULL logic high is generated by the computer 25, closing switch SW2 and another switch SW4 and thereby connecting the IN terminal to the OUT terminal of each of these two switches. (Switches SW1, SW2 and SW3 are commercially available products with type number 4016 and switch SW4 is also commercially available with type number 4066.) Switch SW2 applies voltage D to the noninverting input of a comparator 99. The output of another comparator 101 is voltage divided by approximately 100 by voltage divider resistors 103 and 105. Resistor 103 is connected between the output of comparator 101 and the IN terminal of switch SW4, and resistor 105 is connected between the IN terminal of switch SW4 and common. A resistor 107 and capacitor 109 are connected in series across resistor 103. Since a resistor 111 is connected between the OUT terminal of switch SW4 and an inverting terminal of comparator 99, the voltage divided and filtered output of comparator 101 is fed back to an inverting input of comparator 99 through the resistor 111 when switch SW4 is closed.

An 8.2 microfarad capacitor 113 is connected to the inverting input of comparator 99, and capacitor 113 is connected in series with a 0.022 microfarad capacitor 115 to the output of comparator 99. The output of comparator 99 is directly connected to the noninverting input of comparator 101. A 2K ohm resistor 117 is connected between common and the connection of capacitors 113 and 115. During null, the capacitor 113 is charged so that the voltage developed across capacitor 113 is equal to the voltage D applied at the noninverting input of comparator 99 by switch SW2 less the value of an internal offset voltage of comparator 99. The inverting input of the comparator 101 is connected to the voltage A (approximately 2.5 volts through a filter consisting of a series resistor 119 and a bypass capacitor 121. During null, the voltage at the noninverting input of comparator 101 becomes equal to voltage A at the inverting input of the comparator 101. Consequently, the capacitor 115, which is the integrating capacitor for input circuit 23, becomes initially charged to a voltage equal to the voltage reference A. The comparator 101 is thus nulled out i.e. the voltages at its inverting and noninverting inputs are equal.

During null the switches SW2 and SW4 are kept closed for a time period of about twenty to sixty milliseconds to charge the capacitors 113 and 115 and to bring the inputs of comparator 101 to the same voltage. At the end of this time period, NULL goes low and switches SW2 and SW4 are opened. At this time, switch SW1 is closed in response to READX going high from the computer 25.

The closing of switch SW1 in response to READX connects the compensated thermocouple voltage TH to the noninverting input of comparator 99. Since the voltage developed across capacitor 113 during null and remaining thereafter is equal to the voltage D less the value of an internal offset voltage of comparator 99, comparator 99 begins to discharge integrating capacitor 115 at a negative rate of voltage change equal to the difference (TH-D) of the filtered thermocouple voltage TH and the voltage reference D. The integration is maintained for a precise time period t1 as determined by the computer 25 terminating the READX high. This time period t1 is chosen so that the integration will not completely discharge the capacitor 115 but is also long enough to produce a large enough voltage change for measurement purposes.

At the end of this time period t1, switch SW1 is opened by READX going low, and a logic high READ 50° C. signal is supplied by the computer 25. The READ 50° C. signal closes switch SW3 which applies voltage E to the noninverting input of comparator 99. The voltage E is larger than voltage D from capacitor 113, and integration now occurs at a positive rate of voltage change across capacitor 115 equal to a difference (E−D) of the voltage E and the voltage D. A timer in the computer 25 is made to begin counting when the switch SW3 is closed. The comparator 101 monitors the voltage level of the capacitor 115 and when the voltage across capacitor 115 rises back up to and just exceeds the voltage A at the inverting input of the comparator 101, the output of comparator 101 produces a high signal CVT IN. In response to the high CVT IN the computer 25 stops its timer thereby measuring a time t2. This completes the dual-slope integration.

It is noted that the mathematical relationship of measured time t2 to the thermocouple voltage is found by equating the rate of voltage change times the time t1 during the down integration to the negative of the rate of voltage change times the time t2 during the up integration with the result:

$$TH = D + (D-E)(t2/t1)$$

Measured time t2 is related to the compensated thermocouple voltage TH as above, and the compensated thermocouple voltage is related in a known way to the temperature to which sensor 15 is exposed. Consequently, the measured time t2 is conveniently used instead of temperature by the computer 25 as the quantity from which is determined the conductance of an equivalent thermistor for instrument 9 of FIG. 1.

Figure 3:
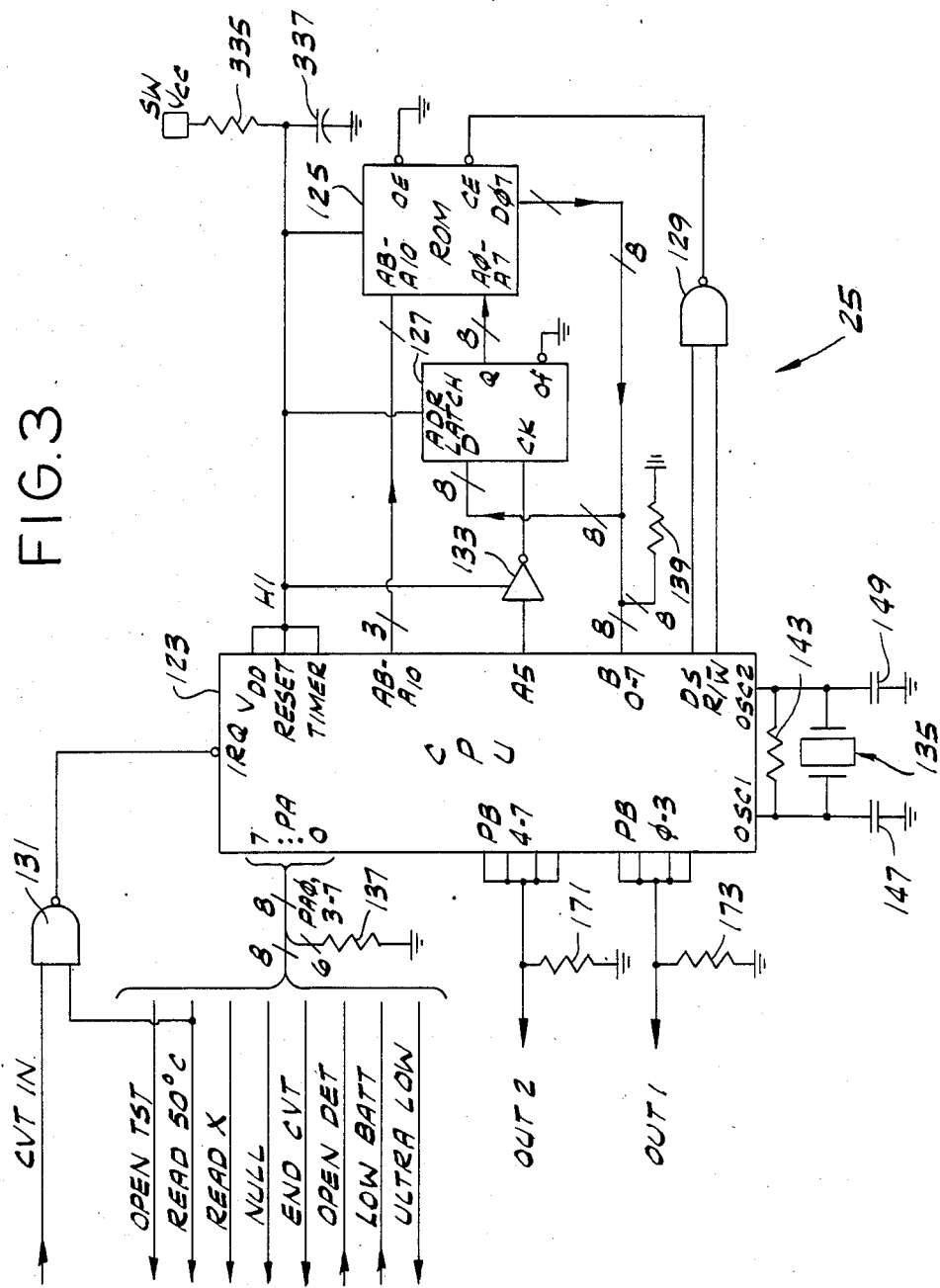
FIG. 3 is a circuit diagram of a computer included in FIG. 1.

The computer 25, as shown in FIG. 3, performs control functions, table lookups and data calculations. The computer 25 has a central processing unit 123 (CPU), read only memory 125 (ROM), address latch 127 (ADR LATCH), NAND gate 129, NAND gate 131, inverter 133 and clock crystal 135. The CPU 123 is a commercially available unit with type number 146805 E2. CPU 123 has a port A with eight lines PA7 to PA0. These lines PA7 to PA0 are respectively designated OPEN TST, READ 50° C., READ X, NULL, END CVT, OPEN DET, LOW BATT and ULTRA LOW. OPEN DET and LOW BATT are input lines and the other six are output lines with their six respective pull down resistors 137. The NAND gate 131 has one input connected to READ 50° C. and another input connected to CVT IN from the output of comparator 101 of FIG. 2. The output of the NAND gate 131 is connected to a low active interrupt request pin IRQ on the processing unit 123. The NAND gate 131 thus prevents the interrupting of processing unit 123 until both the READ 50° C. line and CVT IN line are at a logical high, which occurs when the dual-slope integration is completed as described in connection with FIG. 2 hereinabove.

ROM 125 is a type 27C16 memory and holds a set of preprogrammed instructions and a table for use by the CPU 123, as described in further detail hereinbelow in connection with FIGS. 6A and 6B. Address latch 127 is clocked by inverter 133 which responds to the output on pin A5 of CPU 123. Address latch 127 has its 8 bit wide Q output connected to a set of address inputs A0-A7 of ROM 125, and additional address inputs A8-A10 of ROM 125 are connected directly to pins A8-10 of CPU 123. The 8 bit wide data (D) input of address latch 127 is connected to the 8 pins B0-B7 of CPU 123 for which 8 pull down resistors 139 are provided. The 8 bit wide data output of ROM 125 is also connected to the 8 pins B0-B7 of CPU 123. The address latch 127 and NAND gate 129 are used to control access to ROM 125. The NAND gate 129 has two inputs connected to data select (DS) and read/write-bar (R/W-bar) outputs of CPU 123. A low-active chip enable (CE) pin of ROM 125 is connected to the output of the NAND gate 129. Low active output-enable pins (OE) on the address latch 127 and ROM 125 are both connected to common.

Clock crystal 135 is connected to pins OSC1 and OSC2 on CPU 123. A resistor 143 is connected in parallel with crystal 135. A capacitor 147 is connected between the OSC1 pin and common and a capacitor 149 is connected between the OSC2 pin and common. In this way clock crystal 135 provides a fixed frequency for the production of clock pulses in CPU 123.

To test for an open circuit resulting from undesired absence of the temperature sensing probe 15 when it should be connected to adapter 1, CPU 123 places a logic high on the OPEN TST line. (See also the discussion of the program of FIGS. 6A and 6B.) The OPEN TST line is connected to the anode of a diode 157 (see FIG. 2), which in turn is connected in series with a resistor 159 to output terminal 21c of filter 21. If the temperature sensing probe 15 is connected to adapter 1, the voltage at terminal 21c is low. The OPEN DET line, which is connected through a resistor 161 to terminal 21c, stays low thus indicating the presence of the temperature sensing probe to CPU 123. If there is an open circuit across terminals 11 and 13 for any reason, however, the OPEN DET line will go high when the OPEN TST line is high.

The processing unit 123 has output connections PB0 through PB7. Outputs PB4-PB7 and PB0-PB3 are paralleled to provide two output lines OUT2 and OUT1 respectively. Output lines OUT2 and OUT1 each have a single pull down resistor 171 and 173 respectively. The processing unit 123 generates output pulses in many distinct series on output lines OUT2 and OUT1, and the number of pulses in any one series of the pulses represents the conductance (inverse of resistance) of an equivalent thermistor at the temperature to which the thermocouple 17 is exposed.

Figure 4:
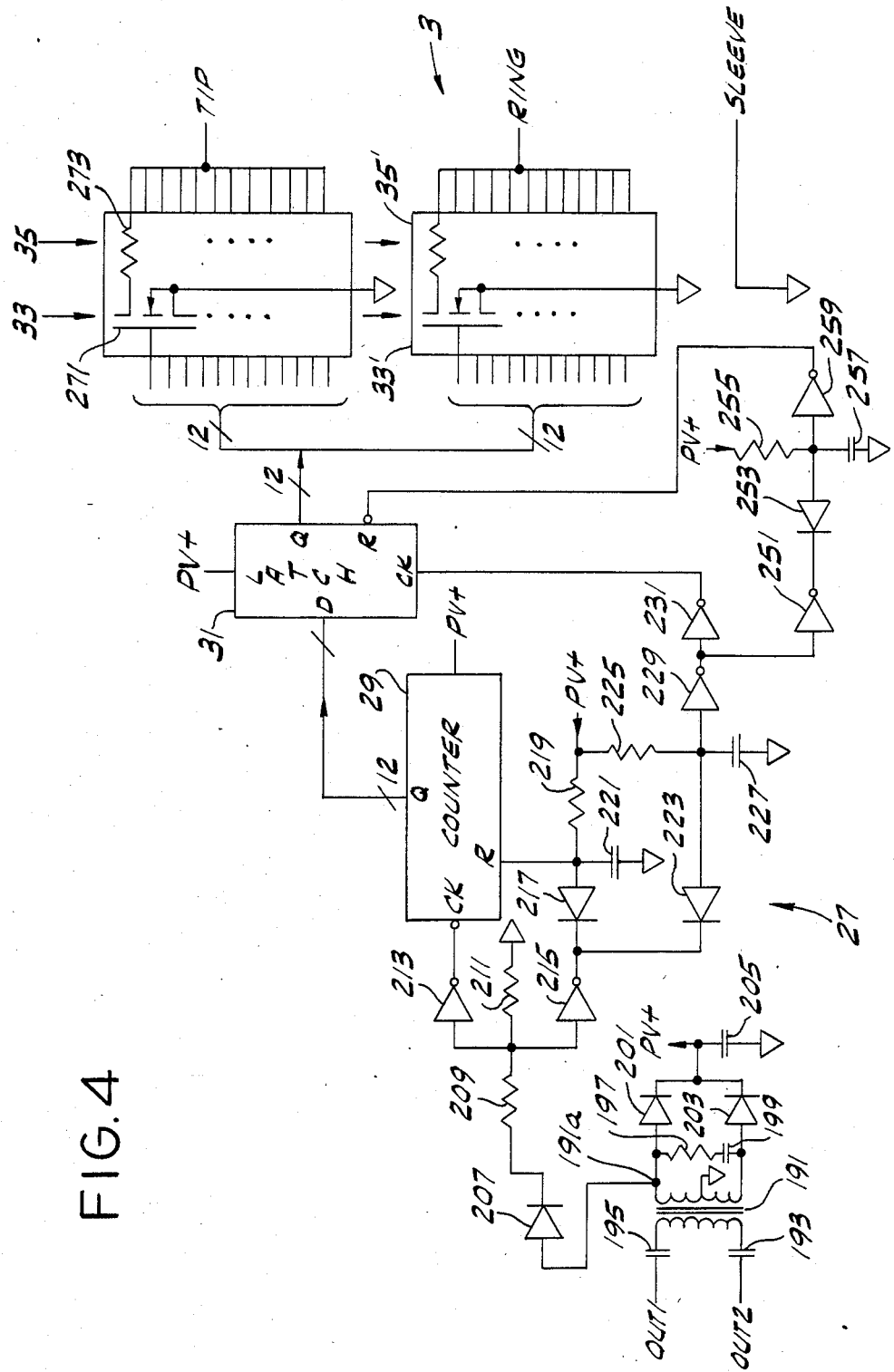
FIG. 4 is a circuit diagram of a pulse receiver and control circuit, counter, latch, selective connection circuit and resistors of the FIG. 1 adapter.

Output lines OUT2 and OUT1 are connected to the primary winding of a pulse transformer 191 through capacitors 193 and 195 respectively as shown in FIG. 4. To energize the primary winding of the pulse transformer 191, pulses are placed by CPU 123 on OUT2 and OUT1 in pulse cycles under control of the program shown in FIGS. 6A and 6B. A single pulse cycle consists of a high pulse on one of the output lines followed by a high pulse on the the other line. Each such pulse cycle supplies a single pulse to counter 29.

The pulse transformer 191 is used to electrically isolate the input circuit 23 and computer 25 from RING, TIP and SLEEVE output terminals 3 of the adapter 1. This isolation is to prevent an inadvertent electrical shock to a medical patient, for example, in case the electrical potential of the temperature measuring instrument 9 becomes substantially different from the electrical potential of the patient's body touching the thermocouple 17 of FIGS. 1 and 2. An output winding of the transformer 191 has a center tap connected to a second common represented by a triangular symbol of FIG. 4 distinct from the ground symbol used for the first common in FIGS. 2 and 3. These two commons are electrically insulated from each other, or optionally the first common can be switchably connected to any point in the circuit of FIG. 4 as the skilled worker elects.

An alternating current voltage corresponding to the pulse cycles is induced across the secondary of the transformer 191 and filtered by a resistor 197 and capacitor 199 connected in series across the secondary so as to remove high frequency components. A pair of diodes 201 and 203 are connected to respective ends of the secondary winding of transformer 191, and have their cathodes connected together and to a 27 microfarad storage capacitor 205. Diodes 201 and 203 full wave rectify the secondary voltage of transformer 191 and provide a rectified voltage PV+. The voltage PV+ is used to supply power to the counter 29, the latch 31 and other circuitry as shown in FIG. 4. The capacitor 205 is sufficiently large so that during a period when pulse cycles are not present, the capacitor 205 retains a sufficient charge to continue an adequate supply of voltage PV+. The first pulse in a pulse cycle which appears at OUT1 is slightly longer in duration than the pulse which appears at OUT2 to permit the capacitor 205 to recharge.

One output terminal 191a of the pulse transformer 191 is connected to the anode of a diode 207. A pair of resistors 209 and 211 are connected in series between the cathode of diode 207 and the second common. Diode 207 half wave rectifies a pulse cycle appearing at output terminal 191a and thus each pulse cycle causes the diode 207 to be forward biased once. A logic high appears once per pulse cycle across resistor 211 and is input to an inverter 213 which is connected to a low-active clock input (CK) of counter 29. The counter 29 is thus incremented once for each pulse cycle.

The manner of resetting counter 29 is now explained. When there is no positive pulse at terminal 191a, the diode 207 is back biased and a high will apppear at the output of an inverter 215 which also has an input connected to resistor 211. The cathode of a diode 217 is connected to the output of the inverter 215, and the diode 217 anode is connected both to the reset (R) terminal of counter 29 and to a resistor 219 which is connected to PV+. A capacitor 221 is connected between the reset connection R of the counter 29 and the second common. When the diode 207 is back biased, the diode 217 will also be back biased due to inverter 215 and thus allow the reset connection R of the counter 29 to begin rising in potential due to the charging of capacitor 221 through resistor 219 from PV+. The time constant of resistor 219 and capacitor 221 is set sufficiently long, e.g. 22 milliseconds, that the counter is only reset after the conclusion of each series of pulses representing a conductance value of the equivalent thermistor, and not reset between pulses in a series.

Another diode 223, which is also has its cathode connected to the output of inverter 215, is also back biased when the diode 207 is back biased. The diode 223 is connected to PV+ through a resistor 225, to a capacitor 227, and to an input of an inverter 229. Capacitor 227 is connected between the input of inverter 229 and the second common. When the diode 207 is forward biased, the diode 223 is forward biased and causes the capacitor 227 to discharge. When the diode 207 is back biased the diode 223 is back biased and causes the capacitor 227 to charge through resistor 225 from voltage PV+. The values of resistor 219 and capacitor 221 and resistor 225 and capacitor 227 are chosen so that a logic high will appear at the input of inverter 229 after a series of pulses is completed and sooner than a logic high appears at the reset connection of the counter 29. When a logic high does appear at the input of inverter 229, its output is inverted by another inverter 231. Inverter 231 has its output connected to a clock input (CK) on the latch 31. When a logic high does appear at the input of inverter 229, the latch 31 is clocked. Because output Q of the counter 29 (12 bits wide) is connected to a corresponding 12 bit wide input D on the latch 31, the output Q of counter 29 is latched into latch 31 when the latch is clocked.

In operation, the counter 29 is initially in a reset condition, i.e., the reset connection is at a logic high. A series of pulse cycles then appears at the output terminal 191a of pulse transformer 191. Each pulse cycle in the series causes a logic high to appear at the input of inverter 213, thus incrementing the counter 29. Resistor 219 and capacitor 221 and resistor 225 and capacitor 227 are chosen so that between pulse cycles in a series the reset input of the counter 29 and the clock input of the latch 31 do not go to a logic high. When the pulse cycles have finished each series, the input of inverter 229 does begin rising in potential and reaches a logic high which causes the output Q of counter 29 to be stored in latch 31. The reset connection R of the counter 29 also rises in potential but does not become a logic high until latch 31 is clocked. When a logic high finally occurs at the reset input of the counter 29, the counter 29 is reset and becomes ready to count the next series of pulse cycles.

The output of inverter 229 is connected to the input of another inverter 251. The output of inverter 251 is connected to the cathode of a diode 253. The anode of diode 253 is connected to an input of an inverter 259 which is connected through a resistor 255 to PV+. A capacitor 257 is connected between the input of inverter 259 and the second common. The output of inverter 259 is connected to a low active reset input of the latch 31. When the diode 207 is forward biased during a pulse cycle, the diode 253 is also forward biased and the capacitor 257 is discharged. When the diode 207 is back biased, the diode 253 is back biased and the capacitor 257 begins charging through resistor 255 from voltage PV+. If capacitor 257 has time to charge to a logic high before again being discharged, the twelve bit wide Q output of latch 31 is reset. Resistor 255 and capacitor 257 have a relatively long RC time constant, e.g. 180 seconds. A logic high at the input of inverter 259 is thus reached only if a pulse cycle has not been received from the computer 25 for a much longer period than occurs in normal operation. This feature advantageously provides a warning of malfunction in the computer 25 because the latch 31 is reset to a value which is at an extreme end of the conductance range of an equivalent thermistor and therefore at an extreme end of a temperature range to be measured.

The 12 bit wide Q output of latch 31 presents a parallel digital signal of logic highs and lows to 12 corresponding input lines of a selective connection circuit 33 comprised of 12 identically connected field effect transistors (FETs), one of which is shown as FET 271. Each input line of selective connection circuit 33 is connected to a gate of its corresponding FET. The source terminal of each FET such as FET 271 is connected to the source terminals of the other FETS in the selective connection circuit 33, and connected to the second common which in a preferred embodiment is connected to the SLEEVE output terminal among the output terminals 3. The drain of each FET such as FET 271 is connected to a corresponding resistor such as 273 in a set of resistors 35. Each resistor in the set 35 is connected by its opposite lead to the TIP output terminal among the output terminals 3.

The set of twelve resistors 35 in the preferred embodiment have values that are successively doubled compared to each other so as to be in the ratio $1:2:4:8: \ldots :2^{11}$. The first resistance 273 in one example embodiment is 1621 ohms and the other resistances are twice, four times, eight times, and so on times as great. Other resistance values are alternatively employed when another thermistor is to be simulated. When a resistance having three terminals is to be simulated, a second selective connection circuit 33' and another set of resistors 35' is added as also shown in FIG. 4. Then the gates of the FETs in the selective connection circuit 33' are respectively connected in parallel with the gates of the FETs in selective connection circuit 33, and the set of resistors 35' are connected to the RING terminal of output terminals 3. The first resistance 273 in another example is 4322 ohms in resistors 35 and 21,940 ohms for a first resistance 273' in resistors 35'.

In operation, when a logic high is present on one of the 12 input lines of selective connection circuit 33 or 33', the FET corresponding to that one input line responds to the logic high and is gated on or put in a conducting state. The corresponding resistor 273 for that FET is then connected across the output terminals 3. Since one, more than one, or all of the twelve input lines of selective connection circuit 33 or 33' are high at once, the output Q of latch 31 supplies a digital control signal which causes a subset of the set of resistors 35 (and 35') to be selected accordingly and effectively connected in parallel across the TIP and SLEEVE (resistors 35) or RING and SLEEVE (resistors 35') for connection to the temperature measuring instrument 9. The conductance represented by the binary value of the digital control signal is thus synthesized or connected across the output terminals 3 in substitution for a thermistor for which the temperature measuring instrument 9 might ordinarily be used. An equivalent thermistor resistance (1 divided by conductance) is thus simulated at each temperature to which the thermojunction 19 is exposed over time.

Figure 5:
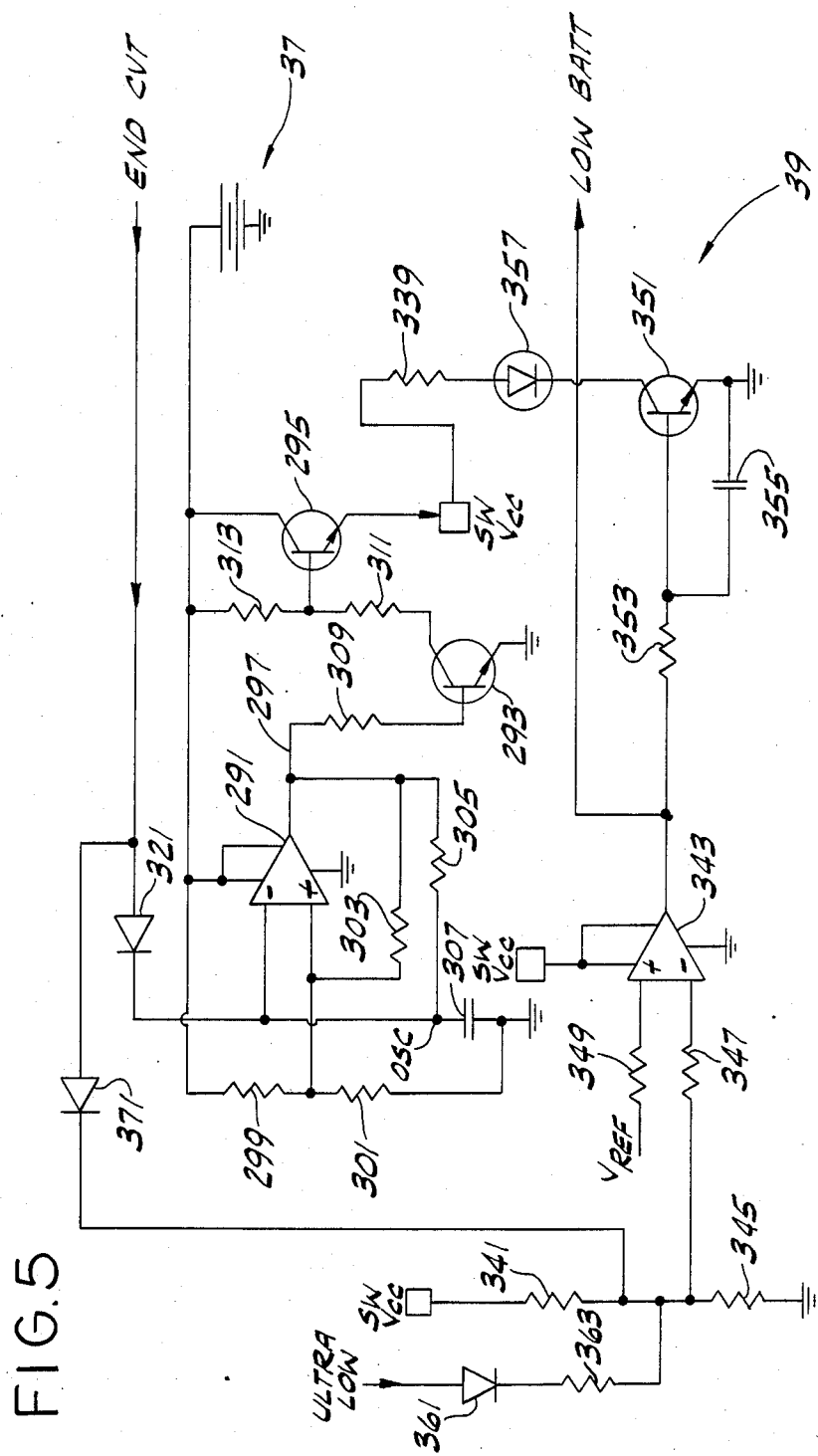
FIG. 5 is a circuit diagram of a battery power control circuit included in FIG. 1.

FIG. 5 shows the battery 37 connected so as to supply power for a comparator 291, a transistor 293 and a transistor 295 in battery control circuit 39. The comparator 291 is connected to provide a high or low output at line 297. A reference voltage is supplied to a noninverting input of comparator 291 by a voltage divider network of resistors 299 and 301 connected between the battery 37 and the first common (ground symbol). A resistor 303 connected between the line 297 and the noninverting input of comparator 291 provides hysteresis for the comparator. A resistor 305 is connected between line 297 and the inverting input of comparator 291. A capacitor 307 is connected between the inverting input of comparator 291 and first common so that the voltage on capacitor 307 is input to comparator 291. When line 297 is at logic high, the capacitor 307 charges through resistor 305 until the voltage at capacitor 307 exceeds the reference voltage at the noninverting input of comparator 291. When exceeded the comparator 291 forces the line 297 to a logic low. The capacitor 307 then discharges through resistor 305 until the voltage at capacitor 307 goes below the reference voltage at the noninverting input of the comparator 291.

Transistor 293 is used to invert the logic level at line 297. Transistor 293 has a base connected to line 297 through a resistor 309, an emitter connected to first common, and a collector connected to the battery 37 through series connected resistors 311 and 313. When the line 297 is at a logic high the collector of transistor 293 will be at logic low. When the collector of the transistor 293 is at logic low, a positive voltage less than the voltage of the battery 37 is at a point between resistors 311 and 313. Because the base of transistor 295 is connected to this point and an emitter of transistor 295 is connected to the battery 37, transistor 295 conducts and voltage from the battery 37 appears at switched Vcc terminal "SW Vcc". Similarly when the line 297 is a logic low, the transistor 295 is off and the voltage of the battery 37 is disconnected from SW Vcc.

In operation, the computer 25 executes a predetermined sequence of operations as are discussed hereinafter with reference to FIGS. 6A and 6B. When these operations are completed a logic high END CVT occurs (see FIGS. 3 and 5). A diode 321, connected between END CVT and the inverting input of comparator 291 forward biases and the capacitor 307 very rapidly charges high to the voltage of battery 37. The line 297 goes low, forcing transistor 295 off and thus disconnecting the voltage of the battery 37 from SW Vcc. Because line 297 is at logic low the capacitor 307 will begin to discharge through resistor 305 as described above. Values of resistor 305, capacitor 307, and the voltage reference at the noninverting input of comparator 291 are chosen so that the discharge of capacitor 307 will continue for approximately 6 seconds. The line 297 goes to a logic high and as described above reconnects the voltage of the battery 37 to SW Vcc and causes the computer 25 to "wake up". SW Vcc is used for powering the input circuit 23 and computer 25 as shown in FIGS. 1, 2, 3, and 5. In FIG. 2 SW Vcc is connected to a resistor 331 which is connected to a storage capacitor 333. Voltage at the capacitor 333 is connected to line 52, to comparators 99 and 101, and electronically controlled switches SW1, SW2, SW3 and SW4. In FIG. 3 SW Vcc is connected to a resistor 335 which is connected to storage capacitor 337. Voltage at the capacitor 337 is connected to supply power for the ROM 125, address latch 127, inverter 133, NAND gates 129 and 131 (connections omitted for clarity), and pins Vdd, Reset, and Timer on CPU 123. In FIG. 5 SW Vcc in various parts of the circuitry is connected to a resistor 339, resistor 341 and comparator 343. Since voltage on SW Vcc is repeatedly off for six seconds at a time, energy consumption by the circuits connnected thereto is reduced and adapter 1 is more energy-efficient.

The battery control circuit 39 also provides indication of a low battery condition. In FIG. 5 terminal SW Vcc is connected to a voltage divider consisting of resistors 341 and 345. Voltage across the resistor 345 is connected to an inverting input of comparator 343 through a resistor 347. A voltage reference $V_{REF}$ is applied to a noninverting input of comparator 345 through resistor 349. When the output of comparator 343 goes to a logic high, a signal LOW BATT is given to the computer 25 (see FIGS. 3 and 5). In addition, the output of comparator 343 is connected to a base of a transistor 351 through a resistor 353. A capacitor 355 is connected between the base and the emitter of transistor 351. When the output of comparator 343 goes to a logic high, transistor 351 goes to an on or conducting state. This turns on light emitting diode 357 which is connected to the collector of transistor 351 and which diode is also connected to SW Vcc through resistor 339. The reference voltage $V_{REF}$ is voltage A (2.49 volts, from FIG. 2) and the resistors 341 and 345 are chosen so that output of the comparator 343 is a logic low unless the battery voltage falls to a moderate state of discharge at which point a warning of a low voltage condition of the battery 37 is to be given while the adapter 1 is still operative. Thus, the diode 357 provides a visual indication that a low battery condition exists and the battery should be replaced.

An additional check on the voltage of the battery 37 is made in the battery power control circuit 39. The computer 25 (see FIG. 3) when it performs this check, places a logic high on ULTRA LOW under the control of the program described by the flow chart shown in FIGS. 6A and 6B. A diode 361 is connected between ULTRA LOW and a resistor 363 which is in turn connected to the resistor 345. When ULTRA LOW is at a logic high the diode 361 is forward biased and current flows through the resistor 363. The voltage-divided potential at resistor 345 rises and this higher potential appears at the inverting input of comparator 343. The comparator 343 now compares this potential to the voltage reference $V_{REF}$ to determine whether the voltage on SW Vcc is too low even with this additional potential. The value of resistor 363 is chosen so that if the output of comparator 343 goes to logic high when ULTRA LOW is at logic high, the voltage of battery 37 as indicated at SW Vcc is too low for continued reliable operation. The computer 25 monitors the LOW BATT line when it makes the ULTRA LOW line high, to determine whether its operations should be discontinued.

A diode 371 is connected between resistor 345 and the line END CVT. Diode 371 is forward biased when an end-convert signal thereon goes high, indicating that the computer has completed a sequence of its operations. Diode 371 raises the voltage at the inverting input of comparator 343 high, preventing a LOW BATT low battery indication during the end-convert part of normal operations of computer 25.

Figure 6A:
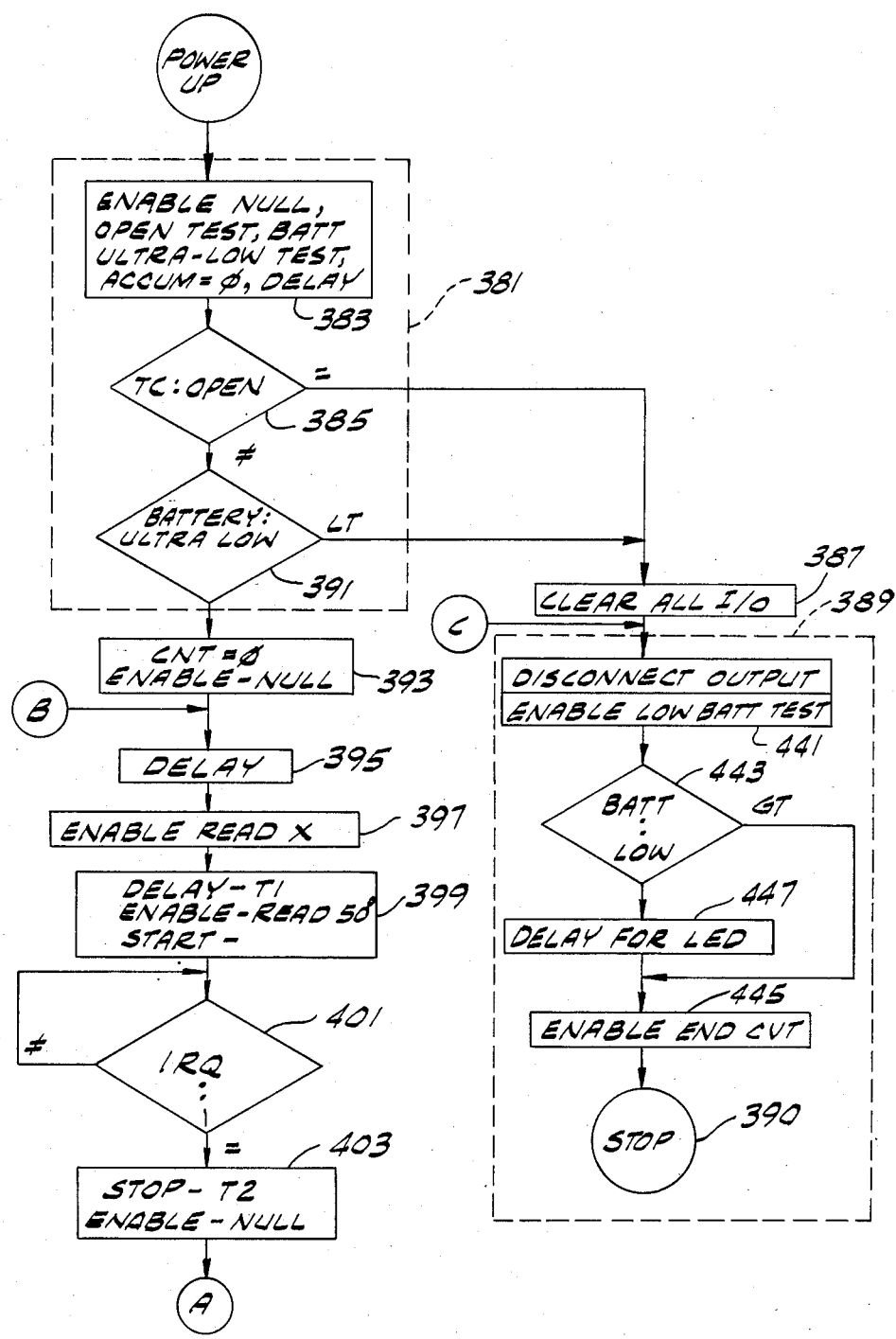
FIGS. 6A and 6B are flow charts of a program for the computer shown in FIGS. 1 and 3.
Figure 6B:
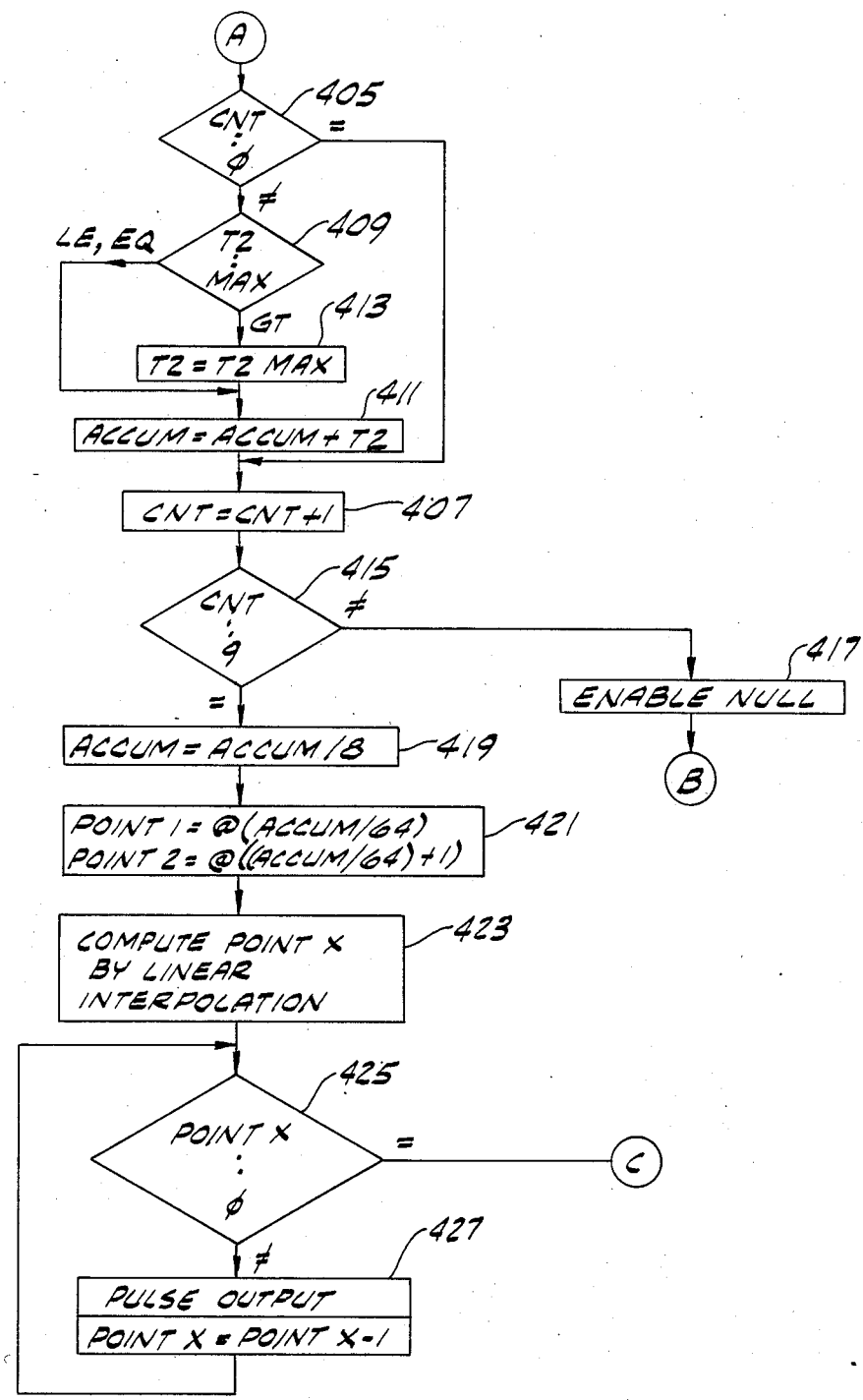

The computer 25 operates according to programmed steps of a method of operation of the preferred embodiment of the invention and shown in flowchart form in FIGS. 6A and 6B. The program is stored in ROM 125 and executed by CPU 123. When power is connected to the computer 25 by battery power control circuit 39, a power up sequence 381 is initiated. A first step 383 sets NULL high in FIGS. 2 and 3 to prepare for the dual slope integration carried out by input circuit 23 and computer 25. Also the sensor open test signal OPEN TST is set high in FIGS. 2 and 3, and the ultra low battery test signal ULTRA LOW of FIGS. 3 and 5 is set high. An accumulator (ACCUM) of CPU 123 is initialized to zero. A programmed delay occurs in order for those circuits to which the battery voltage has been applied to reliably respond to the computer 25.

A next step 385 TC:OPEN (thermocouple open) tests the signal OPEN DET from FIG. 2 to determine whether thermocouple 17 is connected to terminals 11 and 13. If thermojunction 19 is not present or failed open, OPEN DET is high and operations branch from step 385 to a step 387. Step 387 clears all input/output whence a power down sequence 389 is executed and STOP 390 is reached. If a thermojunction 19 is present and not open in step 385, the program proceeds to BATTERY:ULTRA LOW step 391 in which the signal LOW BATT of FIG. 5 is checked for a high while the computer 25 holds ULTRA LOW signal of FIG. 5 high. If the voltage of battery 37 is not adequate for continued reliable operation as indicated by LOW BATT high, operations branch to step 387 which goes to the power down sequence 389.

If LOW BATT is low at step 391, a main sequence for analog to digital (A/D) conversion by dual slope integration is started at step 393 in which the NULL signal is asserted. This is done to eliminate drift from a null point at the output of comparator 99 of FIG. 2 which drift could introduce error in the A/D conversion. A loop counter CNT is also set to zero at this time. Then step 395 causes a delay so that the high signal NULL is present for a sufficient period to bring about an actual null. In step 397 NULL is set low and signal READX is set high. The output of comparator 99 integrates down at a rate related to thermocouple voltage TH as described above in connection with FIG. 2. In step 399 READX is kept high for a precise time delay period t1. READX is then set to a logic low and the down integration is complete. Now in step 399 integration back up is started by setting signal READ 50° C. high and starting an internal timer of CPU 123 for measuring the time t2 required for the output of comparator 99 to integrate back up to voltage A in FIG. 2. When in step 401 the low-active interrupt IRQ input of CPU 123 is activated, operations proceed to step 403. The interrupt occurs because READ 50° C. high qualifies NAND gate 131 of FIG. 3. Since the other input of NAND gate 131 is connected to CVT IN, the NAND gate 131 output provides an interrupt low when CVT IN goes high at the end of the up integration. Upon interrupt, step 403 is reached and the internal timer is stopped, indicating a measured time t2. In order to prepare for the next measurement, the signal NULL is reasserted high.

Operations continue in FIG. 6B in step 405. (It is emphasized that three letters A, B and C are used in FIGS. 6A and 6B to indicate how these two Figures connect together, and that these letters are not related to voltages A, B and C of FIG. 2.) The loop counter CNT value is checked to see if this is a first time (zero count) through the main sequence. If CNT is zero, operations branch to step 407 where the count value CNT is incremented by one and the measured t2 value is ignored so that any initial transients or instability of the thermocouple voltage TH do not disturb subsequent calculations. If at step 405 the counter CNT is not equal to zero, processing continues in step 409 in which the time t2 is checked to see if it has gone beyond a predetermined maximum T2MAX. If t2 is less than or equal to the maximum, the program branches to step 411. If the time t2 has exceeded the maximum, operations proceed to step 413 in which the measured time value t2 is set to the maximum value T2MAX. Next, in step 411 the measured time value t2 is added to the accumulator ACCUM which keeps a running total and then in step 407 the counter CNT is incremented by one. The processing continues in step 415 at which the loop counter value CNT is checked to see if it has a value of nine.

When the counter has a value of nine, eight values of measured time t2 will have been added to the accumulator in step 411. If the count is not yet nine, step 417 is executed in which NULL is set high. The NULL high in step 417 is made to occur for a shorter time than the other steps in which a NULL occurs. This is because in step 417 the processing is between measurements of the value of t2 and less time is required to assure that the null operation actually returns the A/D conversion to its starting point.

Upon completion of step 417 the program loops back to step 395, and another complete A/D dual slope integration occurs as described above. As long as the the loop counter value CNT is not equal to nine, the program branches from step 415 through step 417 back to step 395. When eight values of t2 have been added to the accumulator ACCUM, an average measured time t2 is calculated by dividing the accumulator by eight in step 419.

In step 421 a conversion begins from the calculated average measured time t2 to a digital value representing an equivalent conductance of the simulated thermistor. A table is prestored in ROM 125 which contains binary values representing the different conductances (assuming particular values of the resistors 35 of FIG. 4) at addresses which correspond to values of the measured time t2. The table contains fifty entries at successive ROM addresses with each entry being a binary value equal to the conductance of the highest value resistor of resistors 35 in FIG. 4 divided into the conductance of the simulated thermistor at the temperature to which time t2 corresponds. (The conductance of the highest value resistor is the reciprocal of the product of $2^{11}$ times the resistance of resistor 273 in the twelve resistors 35 of FIG. 4.)

In step 421 a first table entry (POINT 1) is read from ROM 125 at an address calculated as the average time t2 in the accumulator divided by sixty-four. A second table entry (POINT 2) is read from ROM 125 at the next higher memory address (one plus the calculated address). A remainder R results from division of the accumulator by sixty-four, and the value of conductance to be found in general is some binary value not stored in the table, which binary value lies between POINT 1 and POINT 2. Therefore, in step 423 a binary value POINT X is determined by linear interpolation based on the values of POINT 1, POINT 2, and remainder R. POINTX equals POINT1+R(POINT2−POINT1). The linear interpolation advantageously permits a relatively accurate calculation of the latest binary value to subsequently put in latch 31 even though there are only 50 addresses in the table. Calculated POINT X is thus a binary value representing relatively accurately the simulated thermistor conductance corresponding to the thermocouple voltage TH.

When calibrating the adapter 1, the reference voltages D and E are adjusted by selecting resistors 61 and 83 and adjusting variable resistors 81 and 89 so that first and last addresses in the table are accessed at calibration temperatures (e.g. 0° C. and 50° C.) to which correspond the respective conductances of the simulated thermistor represented by the table entries at the first and last addresses. This calibration can be effectively accomplished by exposing the thermocouple 19 to media at the calibration temperatures and adjusting variable resistors 81 and 89 until instrument 9 of FIG. 1 correspondingly displays temperature values equal to the calibration temperatures.

Because of the characteristics of the simulated thermistor and the calibrating temperatures chosen in the calibration above, the calculated POINT X is a positive integer. To output a series of pulse cycles equal in number to the positive integer, operations in computer 25 proceed from step 423 to step 425 at which POINT X is compared with zero. If it is not zero, then in step 427 a pulse cycle, described above in connection with transformer 191 of FIG. 4, is output on the PB connections of CPU 123. In step 427 the POINT X is also decremented when the latest pulse cycle is output. The program then loops back to step 425 to again determine if all pulse cycles corresponding to POINT X have been output. Repeated execution of the loop generates a series of pulse cycles equal in number to the binary value of POINT X.

When all pulse cycles have been output, i.e. POINT X is equal to zero, operations branch from step 425 to the power down sequence 389 as shown in FIG. 6A. In step 441 of sequence 389 output is disconnected, e.g. the PB terminals of processing unit 121 are set to a tristate disconnect. Also, in step 441 the ULTRA LOW signal is set back low to permit the battery supply control circuit 39 to check the battery 37 for a low battery condition as contrasted to a battery condition which is too low for continued reliable operation. In step 443 LOW BATT is sensed to determine if a low battery condition exists. If LOW BATT is a logic low, the battery is all right and operations proceed to step 445. If LOW BATT is a logic high, there is in fact a low battery condition and a delay is made to occur in step 447 to permit sufficient time for the diode 357 of FIG. 5 to light up and provide visual indication of the low battery condition. Then in step 445, the computer 25 places a high on END CVT which is shown in FIGS. 3 and 5. SW Vcc is thereby disconnected from the battery 37 and power is removed from the computer 25 and input circuit 23. Operations of computer 25 cease at STOP 390 and do not resume until battery power control circuit 39 of FIG. 5 applies power again, whence operations begin again with Power Up in FIG. 6A.

The time needed for execution from the beginning of the program until STOP point 390 is variable and depends for example on the temperature being measured. This time has been found in operation to be about two seconds, which is thus considerably shorter in the preferred embodiment than the approximately 6 seconds when SW Vcc is disconnected from the battery 37. This significantly reduces the need for battery replacement. For example, by using low power consumption components in adapter 1, the current drawn from the battery 37 is approximately one to three milliamperes, and two mercury cells used as battery 37 have been found to last about 5000 hours.

In view of the above, it will be seen that the several objects of the invention are achieved and other advantageous results attained. As various changes could be made in the above construction without departing from the scope of the inventon, it is intended that all matter contained in the above description or shown in the accompanying drawings shall be interpreted as illustrative and not in a limiting sense.

What is claimed is:

1. An adapter for a temperature measuring instrument having an input terminal for connection ordinarily to a temperature sensor having a resistance which varies as a function of temperature, said temperature measuring instrument to be utilized with a temperature sensing probe of a type having a temperature sensing element which is different from that of the temperature sensor and which produces an electrical signal having a parameter which varies as a function of temperature, the adapter having an output for connection to the input terminal of the temperature measuring instrument, and comprising:

means for processing the electrical signal to generate a corresponding digital control signal representative of different values functionally related to the parameter of the electrical signal; and means responsive to the different values respectively of the digital control signal for producing at the adapter output a resistance which varies as a predetermined function of the parameter of the electrical signal.

2. An adapter as set forth in claim 1 wherein the adapter output has terminals and said means for producing the resistance includes a set of resistances and means responsive to the different values respectively of the digital control signal for connecting corresponding subsets of the set of resistances across the terminals.

3. An adapter as set forth in claim 2 wherein the connecting means includes a set of transistors each having a control terminal for receiving the digital control signal and transistor terminals connected between one of the output terminals and a corresponding resistance of the set of resistances.

4. An adapter as set forth in claim 3 wherein each resistance is connected to the other output terminal and the transistors are field effect transistors having gates as the control terminals for receiving the digital control signal in parallel form.

5. An adapter as set set forth in claim 2 wherein the connecting means includes means for selectively connecting the resistances in each subset of resistances in parallel.

6. An adapter as set forth in claim 1 wherein the processing means includes means for storing the digital control signal and wherein the means for producing the resistance responds to the stored digital control signal.

7. An adapter as set forth in claim 1 wherein the processing means includes means for counting digital pulses to generate the digital control signal and means for generating a series of digital pulses for the counting means, the number of the digital pulses in each series being functionally related to the parameter of the electrical signal.

8. An adapter as set forth in claim 1 further comprising means responsive to a second electrical signal for disconnecting an electrical energy source from the processing means and then reconnecting the source to the processing means a predetermined time period after the disconnection so that energy from the electrical energy source is used periodically and wherein the processing means includes means for processing the electrical signal according to a predetermined sequence of operations commencing with connection of the electrical energy source thereto so that when the sequence of operations is completed the second electrical signal is produced, whereby energy consumption from the electrical energy source is reduced.

9. An adapter as set forth in claim 1 wherein the electrical signal is an analog voltage and the processing means includes means for converting the analog voltage to the digital control signal, said converting means including a computer.

10. An adapter to permit a temperature measuring instrument having an input terminal for connection to a thermistor to be utilized with a temperature sensing probe of a type having a thermocouple sensing element, the thermistor having a resistance which varies in a predetermined relationship with temperature, the thermocouple producing a voltage as a function of temperature, the adapter having output terminals for connection to the input terminal of the temperature measuring instrument, said adapter comprising:

means for processing the thermocouple voltage to generate a corresponding digital control signal representative of different values functionally related to the thermocouple voltage;

a set of resistances; and means responsive to the different values of the digital control signal for selectively connecting across the output terminals subsets of the set of resistances corresponding to respective values of the digital control signal so that the resulting resistance across the output terminals has the same predetermined relationship with the temperature as does the thermistor resistance.

11. An adapter as set forth in claim 10 wherein the set of resistances includes a set of resistors and wherein the connecting means includes means for selectively connecting subsets of the set of resistors accross the terminals.

12. An adapter as set forth in claim 10 wherein the adapter output has terminals and wherein the connecting means includes a set of transistors each having a control terminal for receiving the digital control signal and transistor terminals connected between one of the output terminals and a corresponding resistance of the set of resistances.

13. An adapter as set forth in claim 12 wherein each resistance is connected to the other output terminal and the transistors are field effect transistors having gates as the control terminals for receiving the digital control signal in parallel form.

14. An adapter as set set forth in claim 10 wherein the resistance connecting means includes means for selectively connecting the resistances in each subset of resistances in parallel.

15. An adapter as set forth in claim 10 wherein the processing means includes means for storing the digital control signal and wherein the connecting means responds to the stored digital control signal.

16. An adapter as set forth in claim 10 wherein the processing means includes means for counting digital pulses to generate the digital control signal and means for generating a series of digital pulses for the counting means, the number of the digital pulses in each series being functionally related to the thermocouple voltage.

17. An adapter as set forth in claim 10 further comprising means responsive to an electrical signal for disconnecting an electrical energy source from the processing means and then reconnecting the source to the processing means a predetermined time period after the disconnection so that energy from the electrical energy source is used periodically and wherein the processing means includes means for processing the thermocouple voltage according to a predetermined sequence of operations commencing with connection of the electrical energy source thereto so that when the sequence of operations is completed the electrical signal is produced, whereby consumption of energy from the electrical energy source is reduced.

18. An adapter as set forth in claim 10 wherein the processing means includes means for converting the thermocouple voltage to the digital control signal, said converting means including a computer.

19. A temperature measuring instrument for efficient use of energy from an electrical energy source and for use with a sensor for supplying a first signal having a parameter functionally related to temperature, the instrument comprising:

means for processing the first signal according to a predetermined sequence of operations to provide at the output terminals of the temperature measuring instrument an electrical variable having a value which is a function of the temperature being measured, the predetermined sequence commencing with connection of the electrical energy source to the processing means so that when the sequence of operations is completed a second signal indicative of completion is produced; and means responsive to the second signal for disconnecting the electrical energy source from the processing means and then reconnecting the electrical energy source to the processing means a predetermined time period after the disconnection.

20. An instrument as set forth in claim 19 wherein the predetermined time period exceeds the time for the sequence of operations to be completed.

21. An instrument as set forth in claim 19 wherein the means for disconnecting and then reconnecting includes timing means responsive to the second signal to reconnect the electrical energy source to the processing means at the end of the predetermined time period.

22. An instrument as set forth in claim 21 wherein the timing means produces a third signal at the end of the predetermined time period and wherein the means for disconnecting and then reconnecting includes a transistor having a control terminal responsive to the third signal and transistor terminals connected between the electrical energy source and the processing means.

23. An instrument as set forth in claim 19 wherein the processing means comprises a microcomputer.

24. An instrument as set forth in claim 19 wherein the means for disconnecting and then reconnecting includes a transistor having a control terminal responsive to the second signal indicative of completion of each sequence of operations and transistor terminals connected between the electrical energy source and the processing means.

* * * * *